United States Patent [19]

Fortin

[11] Patent Number: 5,255,542
[45] Date of Patent: Oct. 26, 1993

[54] LOCKING DEVICE FOR CONTAINER DOORS

[76] Inventor: Jean Fortin, 480 rue de Verdun, 76600 Le Havre, France

[21] Appl. No.: 584,716

[22] Filed: Sep. 19, 1990

[30] Foreign Application Priority Data

Jan. 22, 1990 [FR] France .................. 90 00827

[51] Int. Cl.⁵ ............................................ E05B 67/36
[52] U.S. Cl. ........................................ 70/34; 70/104; 70/386; 292/302; 292/327
[58] Field of Search ............... 70/89, 90, 104, 386, 70/14, 18, 19, 34, 232, 32; 292/302, 327, DIG. 9, DIG. 17

[56] References Cited

U.S. PATENT DOCUMENTS

| | | | |
|---|---|---|---|
| 962,827 | 6/1910 | Gill | 292/302 |
| 1,332,291 | 3/1920 | Goodell | 292/327 |
| 1,351,117 | 8/1920 | Newhall | 292/302 |
| 1,653,157 | 12/1927 | Edelson | 70/104 |
| 2,074,133 | 3/1937 | Rodin | 292/302 |
| 3,071,958 | 1/1963 | Russo | 70/361 X |
| 3,151,698 | 10/1964 | Pollock | 292/302 |
| 3,401,543 | 9/1968 | Lewis | 70/237 |
| 3,464,241 | 9/1969 | Wellekens | 70/91 |
| 3,867,822 | 2/1975 | Morse et al. | 70/232 X |
| 4,047,745 | 9/1977 | Krenz | 292/302 |
| 4,541,256 | 9/1985 | Green | 70/371 X |
| 4,762,347 | 8/1988 | Siblik et al. | 292/302 X |
| 4,844,519 | 7/1989 | Dagon | 292/302 X |
| 5,036,683 | 8/1991 | Geavjehizian | 70/417 X |

FOREIGN PATENT DOCUMENTS

| | | | |
|---|---|---|---|
| 21913 | 8/1947 | Finland | 292/302 |
| 2640672 | 6/1990 | France . | |

Primary Examiner—Lloyd A. Gall
Attorney, Agent, or Firm—Ostrolenk, Faber, Gerb & Soffen

[57] ABSTRACT

A device for locking a container attached to two leaves of a container door. The device consists of two pieces, one attached to each leaf of the door. A locking bar is inserted through a set of rings, attached to the two pieces, that align when the container doors are closed. A feature of the device allows the relative adjustment of the rings. In one embodiment, a separate metal plate replaces one of the rings and secures the control levers of the vertical bars of the container.

6 Claims, 3 Drawing Sheets

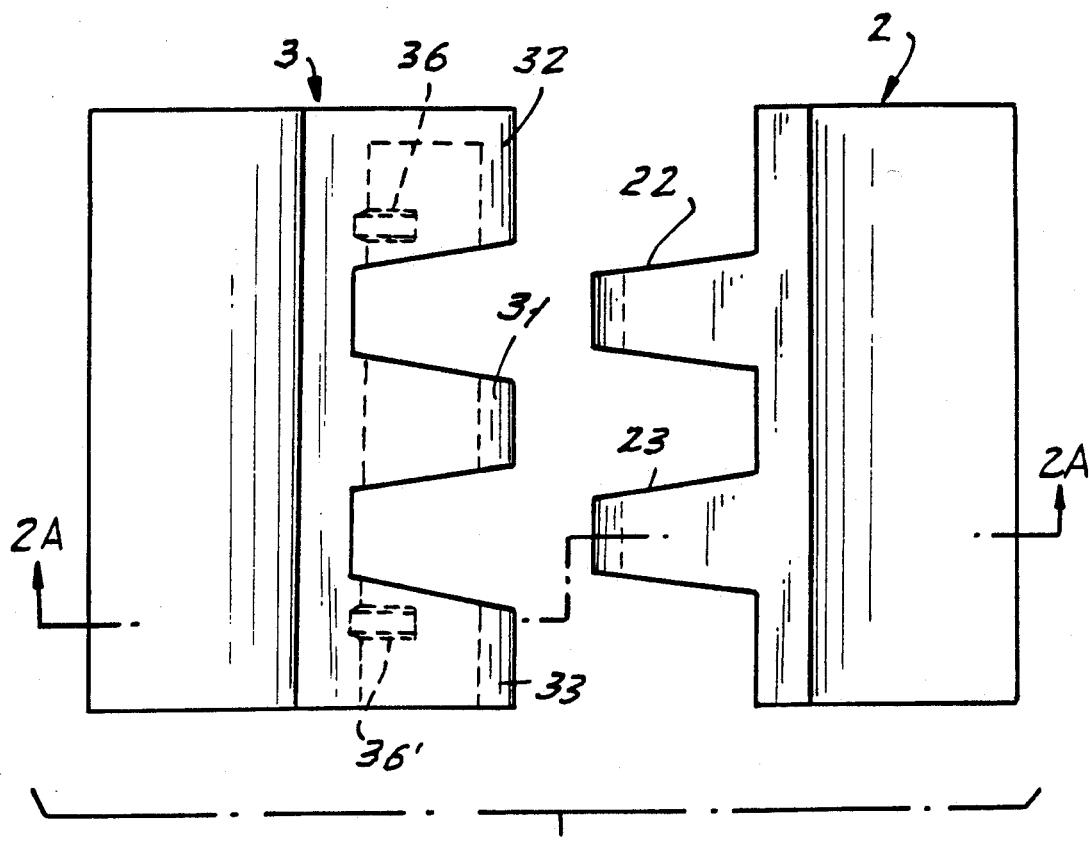
FIG_2.
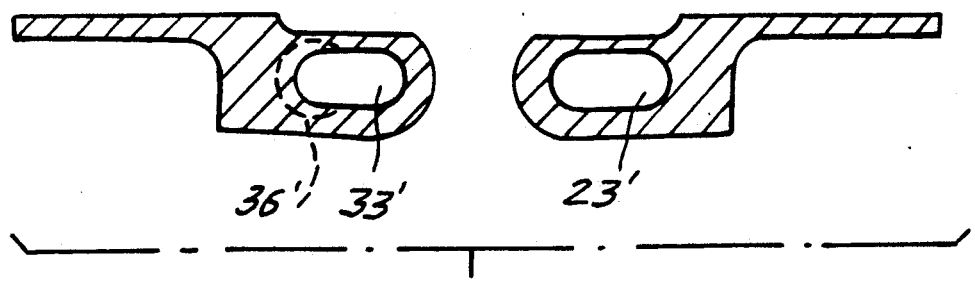
FIG_2A.

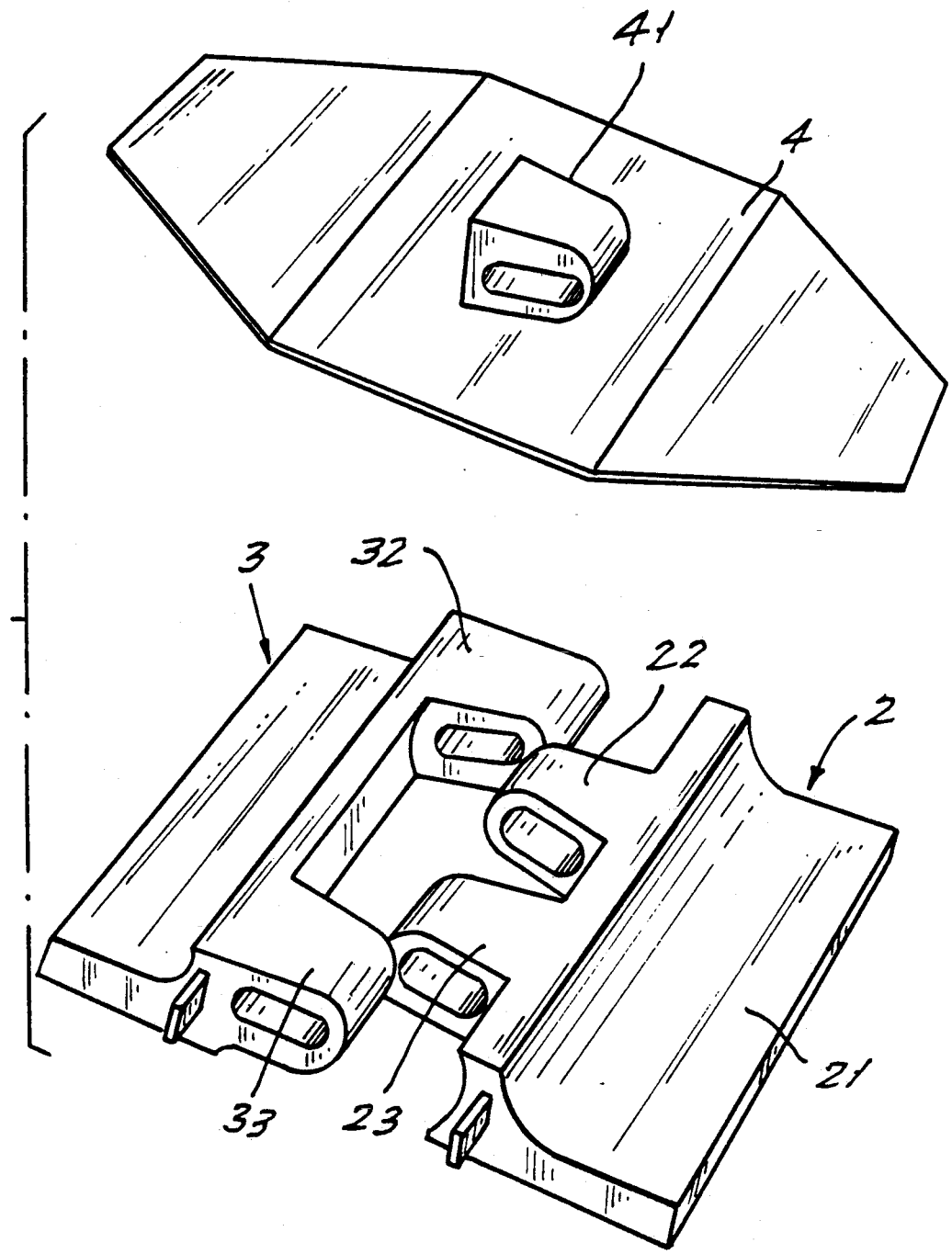
FIG_3

LOCKING DEVICE FOR CONTAINER DOORS

BACKGROUND OF THE INVENTION

The present invention relates to a locking device, and more particularly a device to lock two elements such as the leaves of a container door.

In order to prevent theft by tampering, it is important that trucks or containers be provided with strong and effective devices to securely lock the doors. Various devices have been proposed for this purpose, such as the device which is the object of French Patent Application 8817265, now French Patent No. 2,640,672. In this device, a bar is arranged in front of the doors of the container, anchored at its ends in wedges arranged on opposite sides of the container. One of the anchorings includes a closing and locking system.

This device, however, has the drawback that it protrudes beyond the normal dimensions of the container, so that it is difficult to use for containers which are intended to be stowed in a vessel.

SUMMARY OF THE INVENTION

Accordingly, an object of the present invention is to avert this drawback by proposing a locking device, which conforms to the dimensions of the container, moreover, assuring security of use due to its strength and ease of use. The present invention functions effectively even in the event of deformation of the doors of the container.

Another object is to provide a locking device intended to lock together two elements, such as the two leaves of a container door. The device includes a cylindrical bar which passes through two series of rings, each of which are firmly attached to one of the parts to be locked. For example, the two sets of rings can be fastened alternately to the two leaves of a container door. The cylindrical bar is provided at its end with a security closure which can be operated by means of a key. On turning the key, a latch emerges laterally from the bar and co-acts with a recess provided in one of the rings situated so that it is inaccessible from the outside when the locking has been effected.

The rings are a part of two pieces which can be welded directly onto each of the parts to be locked, or can be welded onto two separate elements which can then be firmly attached to the parts to be locked.

In accordance with the invention, the rings of the locking device have a trapezoidal shape defining a hollow space, the cross-section of which has the shape of a flattened cylinder. In one embodiment, the device is formed of two pieces, the first having at least three rings of this type and the second at least two rings, the latter adapted to fit precisely into the spaces defined by the first set of rings. The bar which is intended to effect the locking of the two parts is shaped so that it can be introduced without play into the first set of rings, each of the rings of the second piece defining a slightly larger space.

Thus, due to the characteristics described above, the inventive device has the advantage that it is easy to use even in the event there is play between the two pieces intended to be locked. In fact, the cargo in a container frequently makes it difficult to close the doors due to slight deformations of the rear frame which results in a displacement of the rings of the locking device.

The trapezoidal shape of the rings of the inventive device affords the advantage of permitting their fitting together even if the two facing pieces are slightly shifted with respect to each other. The larger space defined by the rings of the second piece permits the introduction of the bar which fastens the two parts.

In accordance with another embodiment of the present invention, the device has a third piece formed of a metal plate which, approximately at the center of one of its faces, has a ring having the shape described above. The piece bearing two rings remains unchanged, while the remaining piece has a cut-out in the shape of a trapezoid adapted to receive the two rings and the ring fastened to the third metal plate.

In this case, the metal plate serves additionally to block the contact levers of the vertical bars which actuate the latches arranged on the top and bottom of the frame of the container, thereby constituting an additional safety feature.

The present invention will be better understood from a reading of the following description, which refers to the accompanying drawings.

BRIEF DESCRIPTION OF THE DRAWINGS

FIG. 2 is a top view of the device of FIG. 1.

FIG. 2A is a cross-sectional view along line 2A—2A of FIG. 2; and

FIG. 3 is a view in perspective of a second embodiment of a locking device in accordance with the invention.

DESCRIPTION OF EMBODIMENTS OF THE INVENTION

Figure 1:
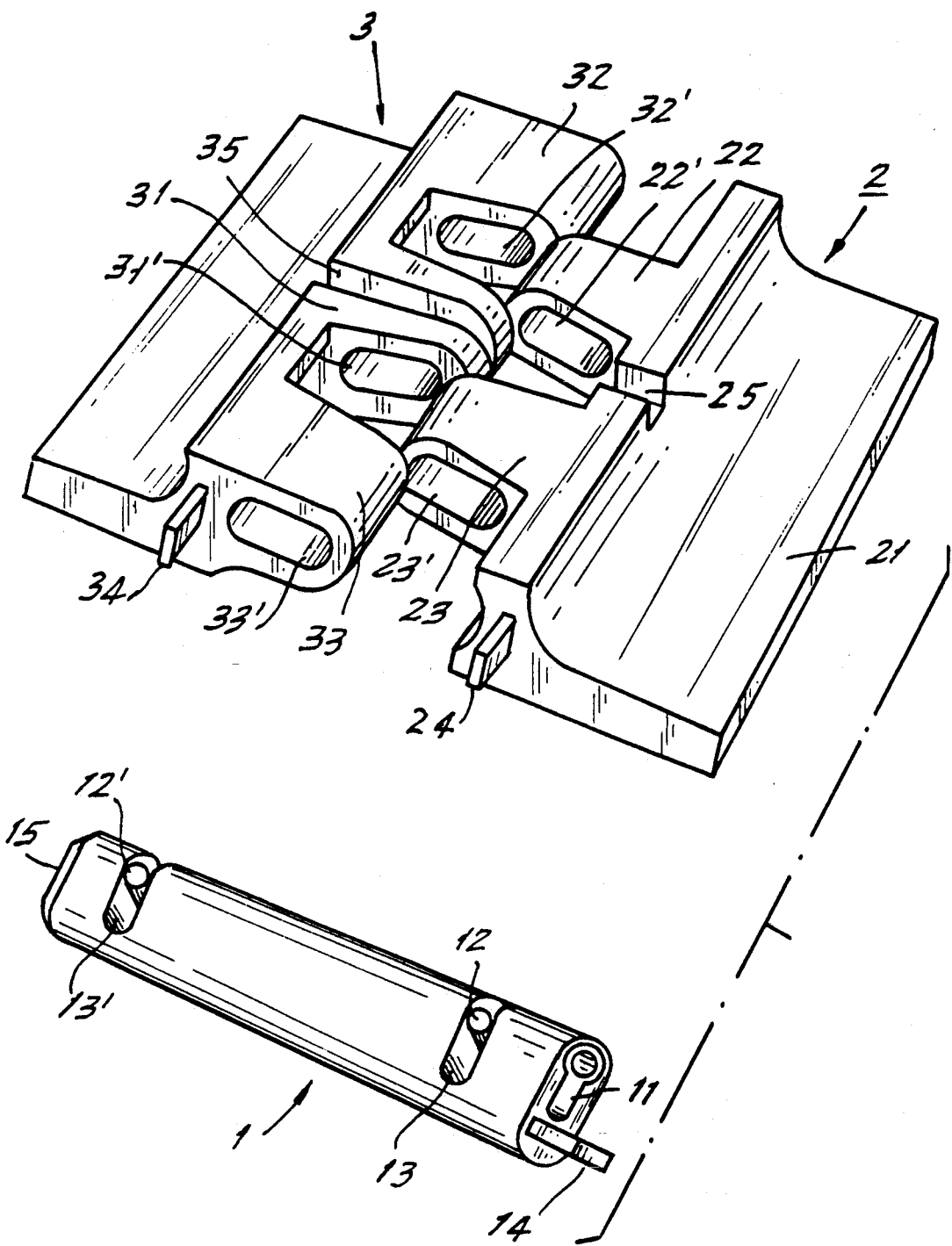
FIG. 1 is a view in perspective of a first embodiment of a locking device in accordance with the invention.

Referring to FIG. 1, the locking device of the invention is formed of three elements, namely bar 1 and pieces 2 and 3, which are intended to be assembled together.

The piece 2 comprises a base 21 which is extended on one of its sides by two rings 22 and 23 of trapezoidal shape, separated by a space which permits the introduction of a ring of the same shape, in the present case, the central ring 31 of the piece 3. The central ring 31 of piece 3 is surrounded by two rings 32 and 33, the two spaces thus defined permitting the insertion of the rings 22 and 23 of the piece 2.

Each of the rings 31, 32 and 33 defines a hollow 31', 32', 33', respectively, the shape and dimensions of which are adapted to receive the bar 1. The cross-section of the bar 1 has the shape of a flattened cylinder, more precisely, of a rectangle prolonged at its two ends by two semi-circles, and comprises at one of its ends a lock 11 intended to actuate two latches 12 and 12' causing them to emerge laterally from the bar 1 through holes 13 and 13'. The latches 12 and 12' enter the two recesses (not visible in this Figure) provided in the rings 32 and 33.

Each of the rings 22 and 23 defines a hollow 22', 23', respectively, the shapes of which are the same as the bar 1, but the dimensions of which are substantially larger.

Furthermore, each of the three pieces 1, 2, 3 of the lock has at its lower end a lug 14, 24, 34 provided with a hole which makes it possible to connect them by a cable, which can be a part of a customs seal.

From FIG. 1, the advantages offered by the lock will be clearly understood. In fact, once the container is loaded, the closing of its doors causes the pieces 2 and 3 to join with each other. The rings 22 and 23 of the piece 2 coming into position in the spaces defined by the rings 31, 32, 33 of the piece 3.

As a result of the slightly larger dimensions of the hollows 22', 23' of the rings 22 and 23, the bar 1 can be introduced into the space formed by the juxtaposition of the five rings even if deformation of the frame of the container prevents the rings 22 and 23 from positioning themselves precisely in the spaces intended for them.

Furthermore, the special shape of the bar 1 prevents it from turning in the rings once it is put in place, thereby facilitating its positioning and the actuating of the latches 12 and 12' by means of the lock 11.

A bevel 15 provided at the end of the bar 1, opposite the lock 11, facilitates its introduction into the space defined by the series of holes of the rings 22, 23, 31, 32, 33.

Finally, a groove 35 arranged in the middle of the central ring 31 of the piece 3 facing a groove 25 provided in the base 21 of the piece 2 makes it possible, if necessary, to compress the ring 31 and/or to move the rings 22 and 23 slightly towards each other. This feature of the present invention may be necessary when there is more extensive deformation of the frame of the container.

Referring to FIG. 2, shown are the same parts as in FIG. 1, namely, the pieces 2 and 3 with their rings 22, 23 and 31, 32, 33, respectively, as well as the two recesses 36, 36' provided in the rings 32 and 33, respectively, in order to receive the latches 12 and 12' of the bar 1.

The cross sectional view of FIG. 2A shows the differences in dimension between the hollow 23' of the rings 22 and 23 and the hollow 33' of the rings 31, 32 and 33. The latter, furthermore, having the recess 36' intended to receive the latch 12.

Referring to FIG. 3, showing another embodiment of the safety lock of the present invention. In this embodiment, the piece 2 remains similar to that of FIG. 1, but, the piece 3 now has only two rings 32 and 33. The rings 32 and 33 define a trapezoidal space adapted to receive on the one hand the two rings 22 and 23 and on the other hand a ring 41 on the same shape and same dimensions as the ring 31 of FIG. 1. Ring 41 is integral with a metal plate 4 which extends extensively on both sides beyond the pieces 2 and 3.

This embodiment has the advantage, to which reference has already been made, of permitting the blocking of the control levers of the vertical bars of the container; the control levers are positioned on opposite sides, near the pieces 2 and 3.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

I claim:

1. A device for locking a container door comprising a bar, said bar adapted to lock a first piece and a second piece, said first and second pieces each being attached to a respective leaf of said container door, each of said pieces including at least two rings separated by a space; said rings of said second piece having holes, said holes and said bar having corresponding shapes, said rings of said first piece also having holes, said holes of said rings of said first piece having a shape corresponding to the shape of said bar but having substantially larger dimensions; and said rings of said first piece being inserted in said space of said second piece when said container door is closed, said bar being inserted through rings of said first and second pieces to lock said container door;

wherein said bar includes means for activating latches within said bar which, when activated, enter corresponding recesses in said rings of said second piece to lock said bar to said second piece.

2. A device according to claim 1, further comprising a metal plate having a ring attached thereto, said ring of said metal plate being inserted in said space in said first piece, said metal plate extending beyond said first and second pieces when said container door is closed, said bar being inserted through said rings of said first piece, said second piece and said metal plate to lock said container door.

3. A device according to claim 1, wherein each of said first piece, second piece and bar has at one end thereof a lug which can be provided with a hole which can accommodate a cable which is a part of a customs seal.

4. A device for locking a container door comprising a bar, said bar adapted to lock a first piece and a second piece, said first and second pieces each being attached to a respective leaf of said container door, each of said pieces including at least two rings separated by a space; said rings of said second piece having holes, said holes and said bar having corresponding shapes, said rings of said first piece also having holes, said holes of said rings of said first piece having a shape corresponding to the shape of said bar but having substantially larger dimensions; and said rings of said first piece being inserted in said space of said second piece when said container door is closed, said bar being inserted through rings of said first and second pieces to lock said container door;

wherein said second piece has a central ring disposed between said two rings of said second piece, said central ring being inserted in said space in said first piece when said container door is closed; and wherein said first piece and said second piece each have a groove, said groove in said first piece being disposed between said two rings of said first piece and said groove in said second piece being disposed in said central ring of said second piece, said grooves permitting said rings of said first piece to be moved towards each other and said central ring of said second piece to be compressed if necessary when closing said container door.

5. A device according to claim 4, wherein said bar includes means for activating latches within said bar which, when activated, enter corresponding recesses in said rings of said second piece to lock said bar to said second piece.

6. A device according to claim 4, wherein each of said first piece, second piece and bar has at one end thereof a lug which can be provided with a hole which can accommodate a cable which is a part of a customs seal.

* * * * *